Aug. 31, 1965 W. M. GROFF ETAL 3,204,029

HIGH SPEED SYNCHRONOUS DIGITAL DATA TRANSMISSION

Filed Feb. 21, 1962 9 Sheets-Sheet 1

Aug. 31, 1965 W. M. GROFF ETAL 3,204,029

HIGH SPEED SYNCHRONOUS DIGITAL DATA TRANSMISSION

Filed Feb. 21, 1962 9 Sheets-Sheet 6

HIGH SPEED SYNCHRONOUS DIGITAL DATA TRANSMISSION

Filed Feb. 21, 1962 9 Sheets-Sheet 7

Aug. 31, 1965 W. M. GROFF ETAL 3,204,029

HIGH SPEED SYNCHRONOUS DIGITAL DATA TRANSMISSION

Filed Feb. 21, 1962 9 Sheets-Sheet 9

United States Patent Office 3,204,029
Patented Aug. 31, 1965

3,204,029
HIGH SPEED SYNCHRONOUS DIGITAL DATA TRANSMISSION

William M. Groff, Silver Spring, Earl D. Gibson, West Hyattsville, and Richard C. Powers, Silver Spring, Md., assignors to ACF Industries, Incorporated, New York, N.Y., a corporation of New Jersey
Filed Feb. 21, 1962, Ser. No. 174,910
17 Claims. (Cl. 178—68)

This invention relates to a system for transmitting and receiving digital data over conventional communication links.

The transmission of digital data at high rates over existing limited bandwidth communication networks is becoming increasingly important. The basic requirement of any transmission system is that data be transmitted and received at a given data rate with a minimum number of errors. As the data rate increases, problems such as amplitude and delay distortion, frequency shift, and noise become more and more troublesome, causing the error rate to become excessive unless special, and often elaborate, means of reducing these problems are employed. In a well designed transmitter-receiver system, the primary cause of errors is impulse, or transient noise, and the type of modulation used is not a significant factor in reducing the effect of this noise on the error rate. In view of this, an amplitude modulation system has advantages over other types with respect to cost, complexity, and size. Accordingly, the invention provides a high speed synchronous quaternary, suppressed-carrier, vestigial-sideband transmission system, employing both amplitude and phase modulation.

The primary characteristics which must be overcome by the system are:

(1) Amplitude distortion
(2) Delay distortion
(3) Frequency shift
(4) Background or broadband noise
(5) Impulse noise The first four of the above characteristics can be handled by a well designed system. However, the last is much more difficult since an impulse can appear equal in duration and shape to a data bit or to many data bits. Thus, the receiver cannot tell the difference between signal and noise.

By virtue of the suppressed carrier transmission a 4800 bit per second quaternary code system according to the invention has about the same signal-to-noise ratio as a two level 2400 bit per second unsuppressed carrier systems. The reason for this is that by using suppressed carrier modulation only two actual voltage levels are transmitted, each with two phases. Thus, there are four signal conditions after modulation, but only two voltage amplitudes. As stated previously, impulse noise affects every type of transmission approximately the same. The complexity, size and cost of this method of transmission, however, are considerably less than any other form.

The advantages of vestigial sideband transmission over double-sideband A.M. for high speed data transmission arises from the bandwidth limitations of conventional wire line circuits. At present, most lines have bandwidths from approximately 300 c.p.s. to 3000 c.p.s. Vestigial sideband transmission almost doubles the transmission rate over double sideband transmission. This is true since both sidebands contain all the data information and the carrier can then be set so that one sideband and a portion (or vestige) of the other sideband is transmitted. As the data rate approaches the carrier frequency, distortion effects become more and more severe. When the data rate equals the carrier rate, there is one cycle of the carrier for each bit of information. As the data rate is further increased the distortion becomes intolerable. If a conversion is made from binary code to quaternary code, the information rate can be doubled. Each state of quaternary signal corresponds to two states of the binary signal. A data stream coming into the transmitter at 4800 bits per second is converted to a data stream of 2400 quaternary digits per second. The carrier and all the other systems parameters remain the same.

A principal object of the invention is to provide high speed digital data communication over a transmission medium having relatively low frequency transmission characteristic.

Another object of the invention is to provide digital data transmission with considerable reduction of impulse noise effects with an economy of equipment.

Other and more specific advantages of the invention will become apparent from the following description and the accompanying drawings wherein.

Figure 2:
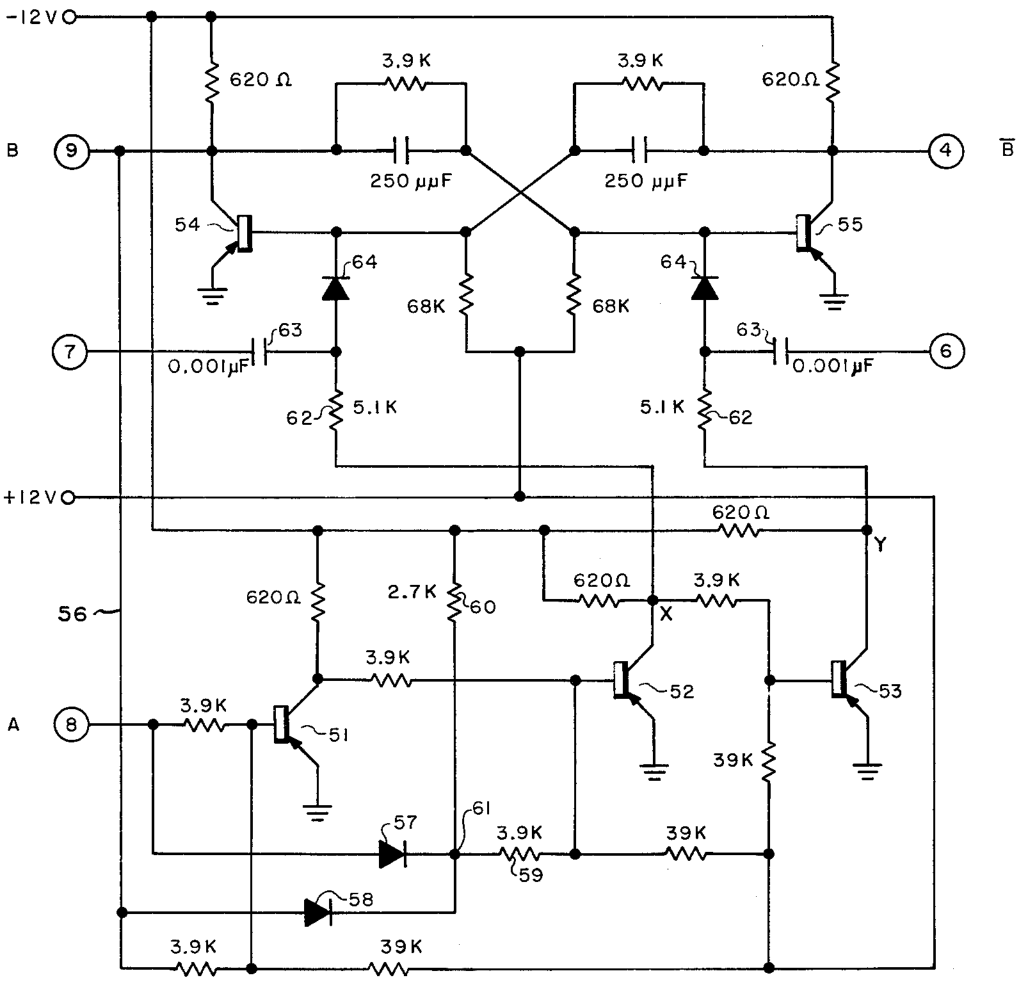
FIG. 2 is a circuit diagram of the transmission code converter in the transmitter.
Figure 2A:
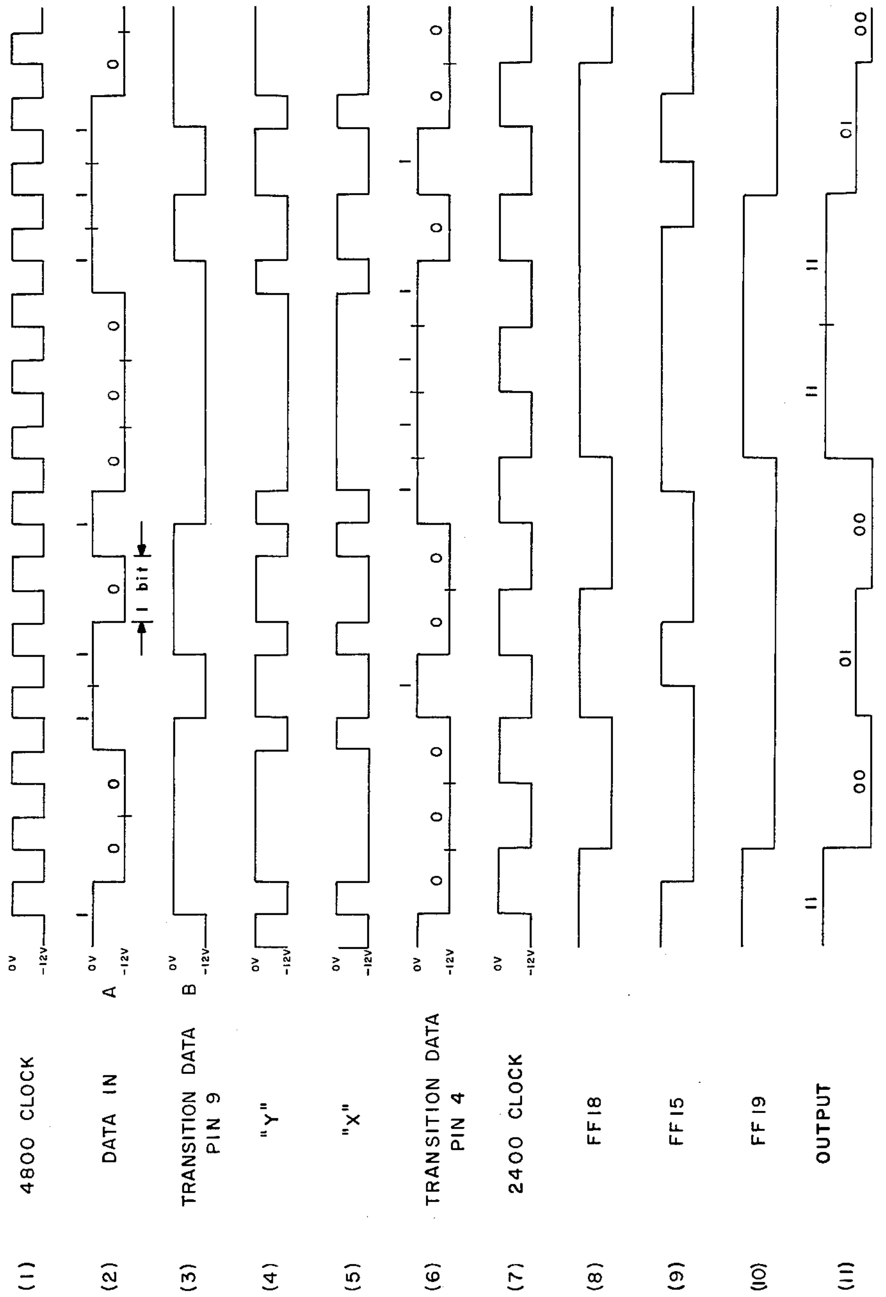
Figure 3:
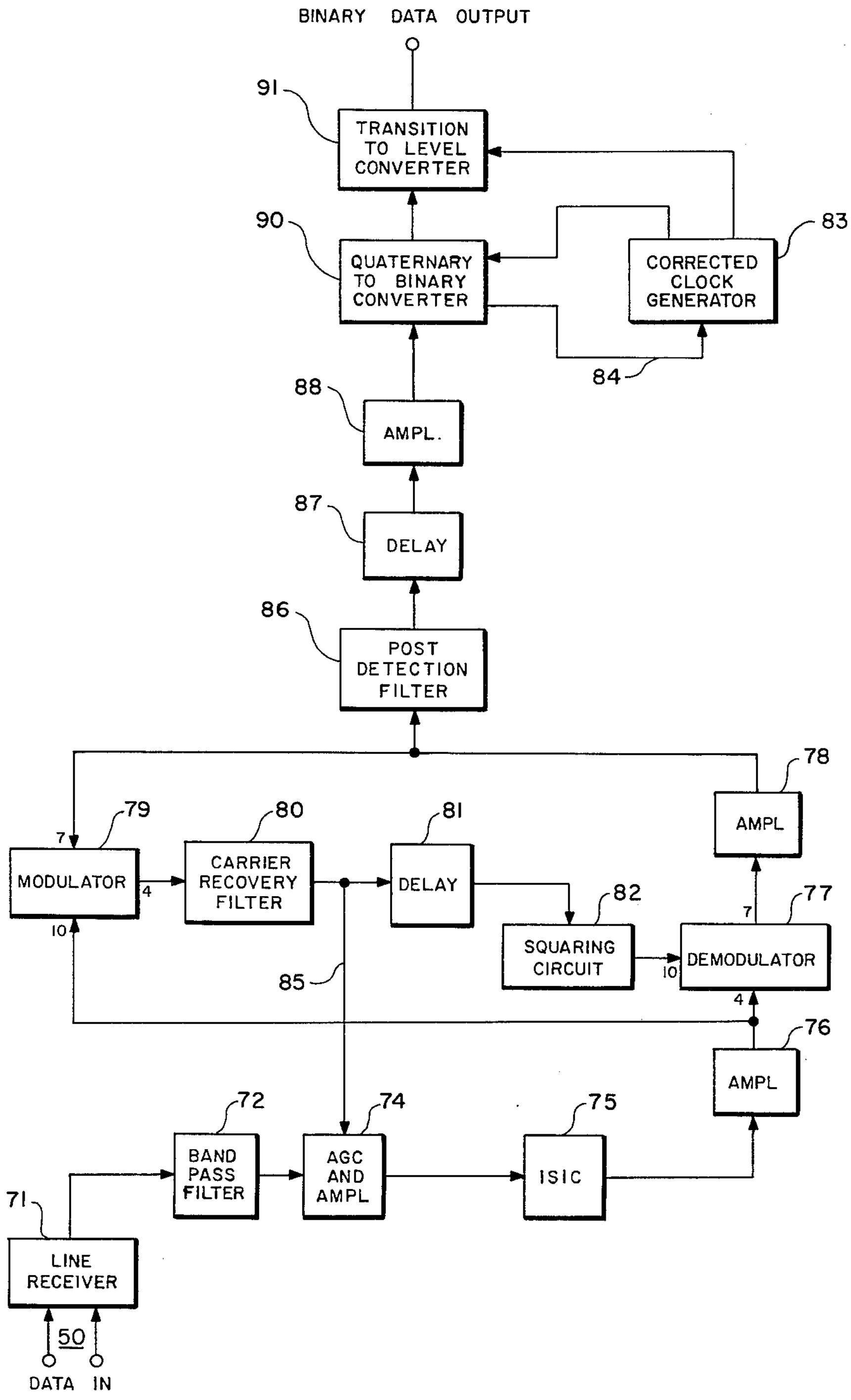
Figure 4:
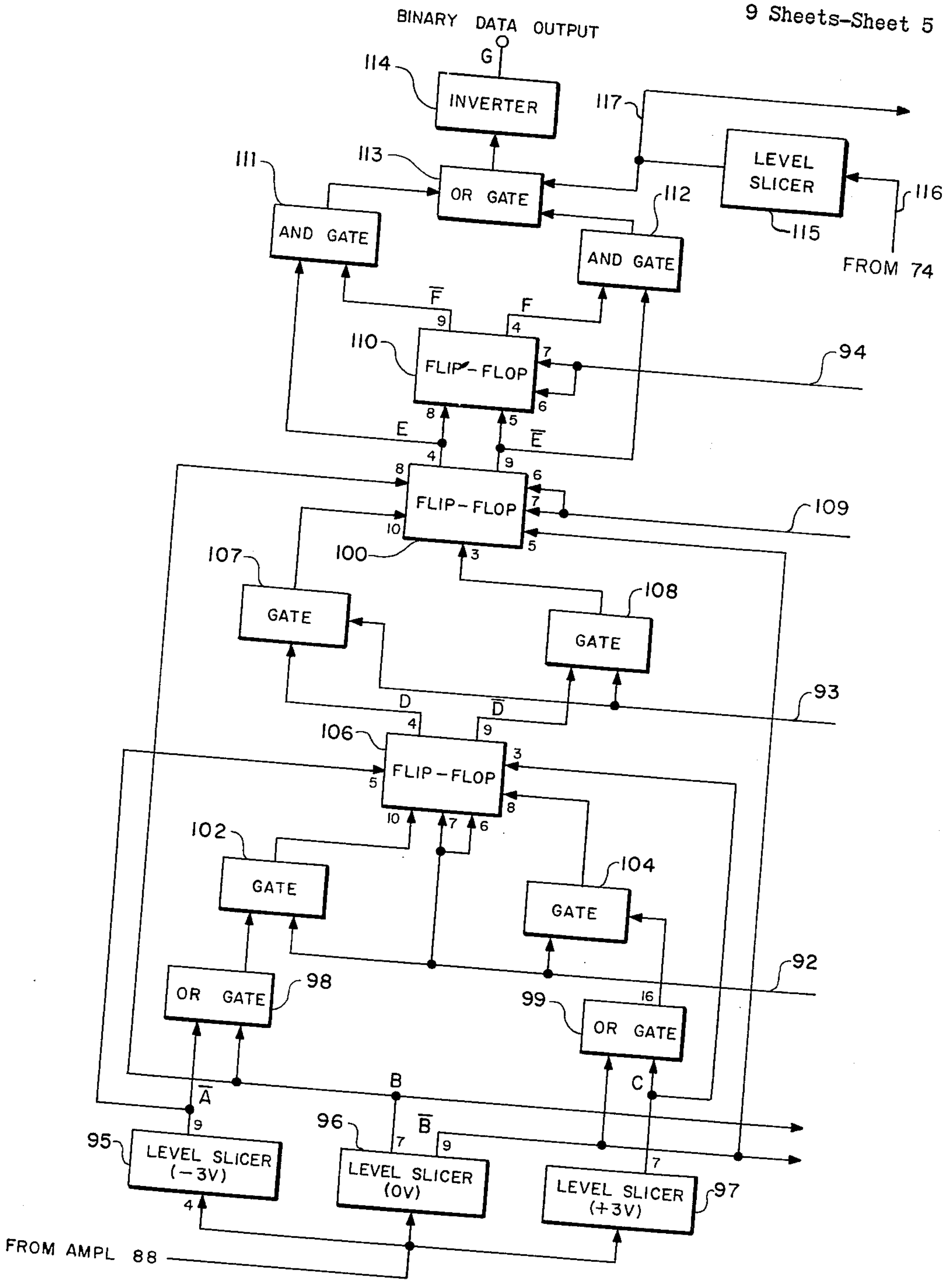
Figure 5:
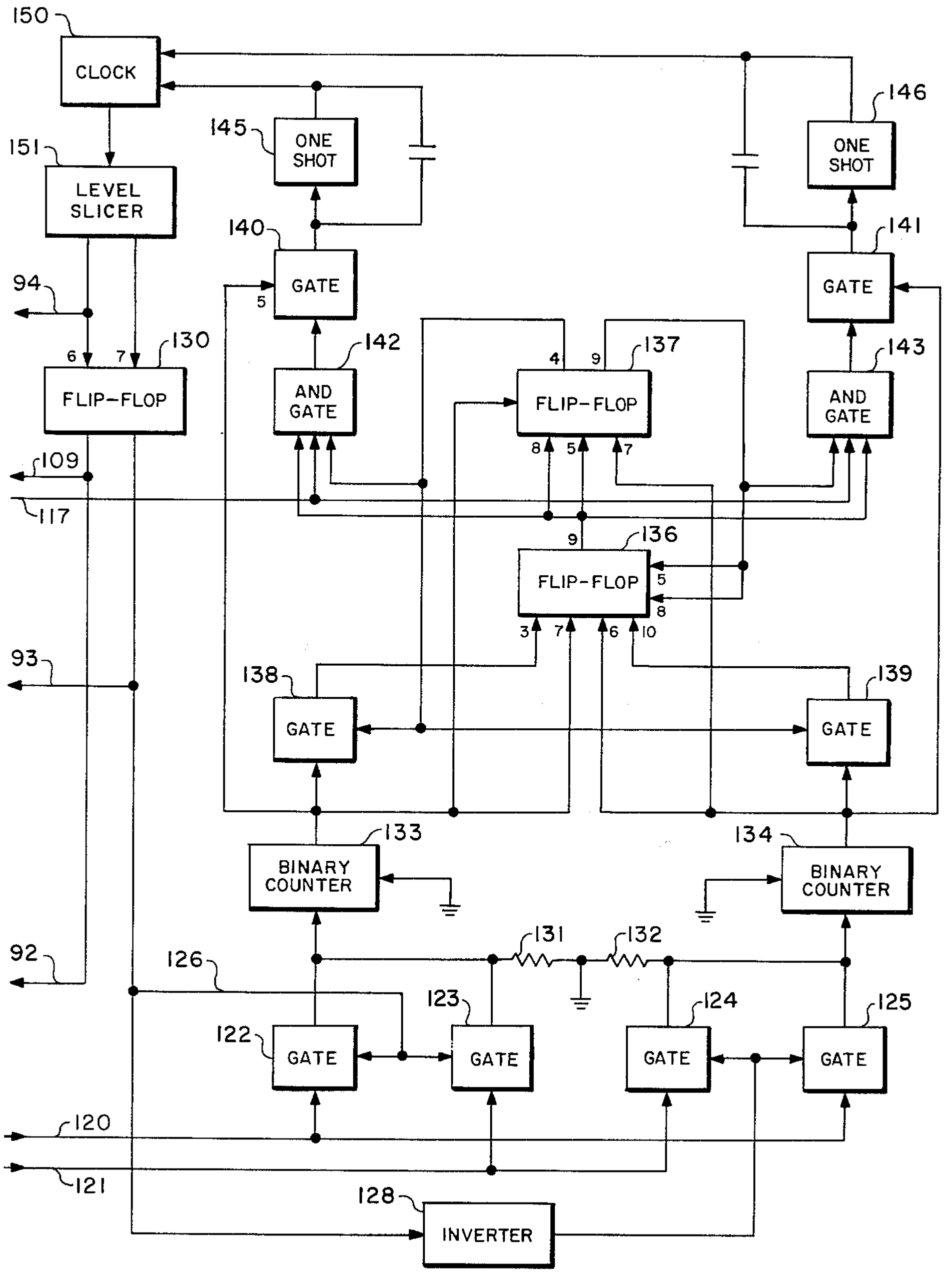
Figure 6:
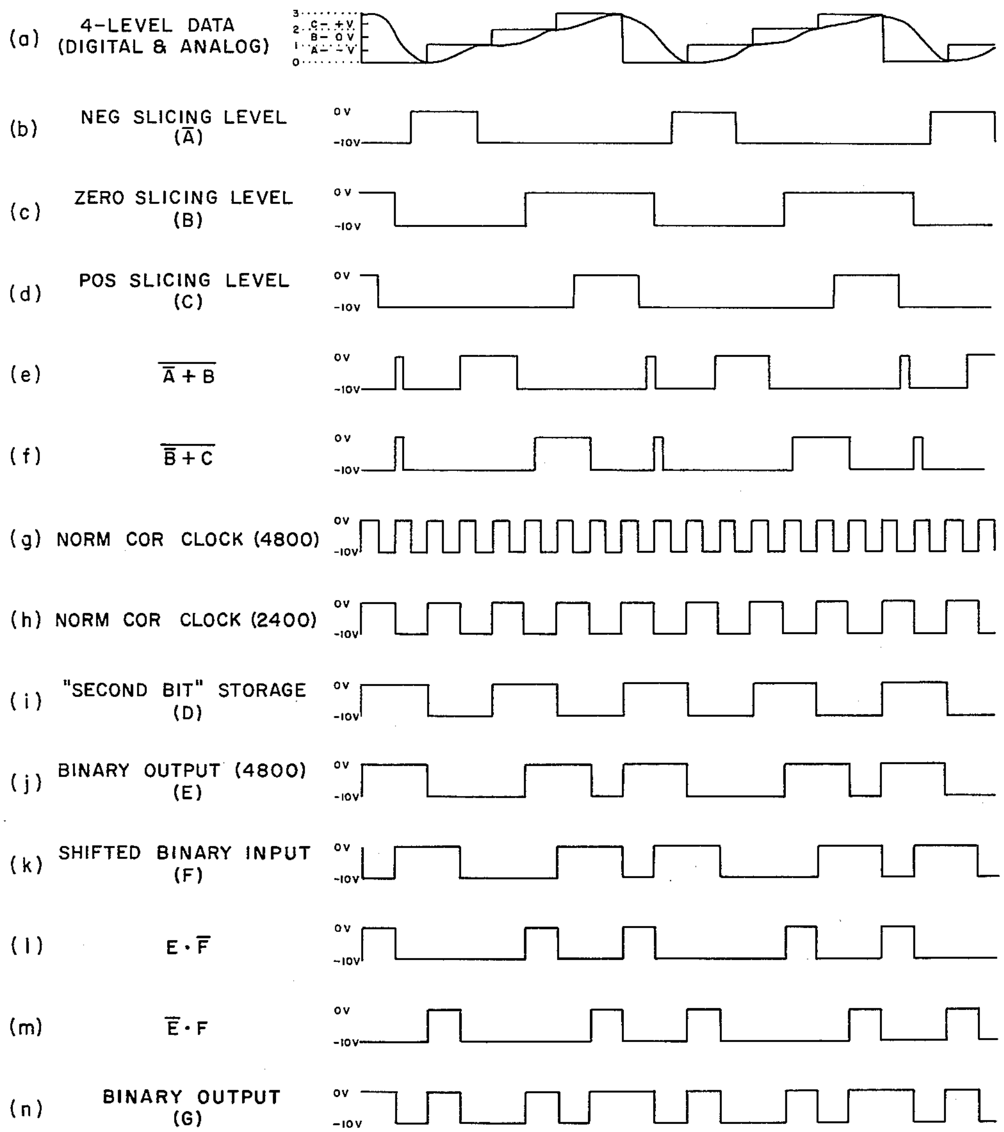
Figure 7:
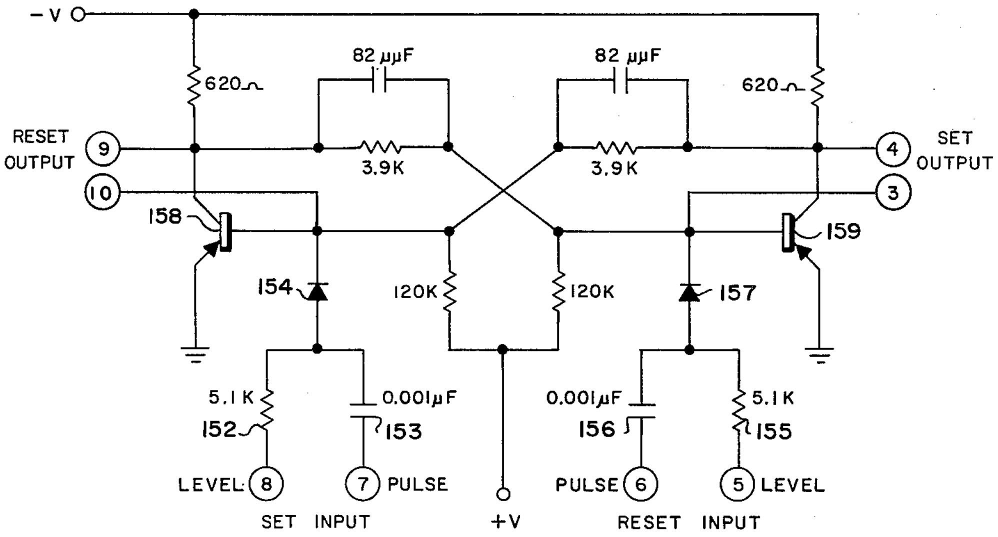
Figure 8:
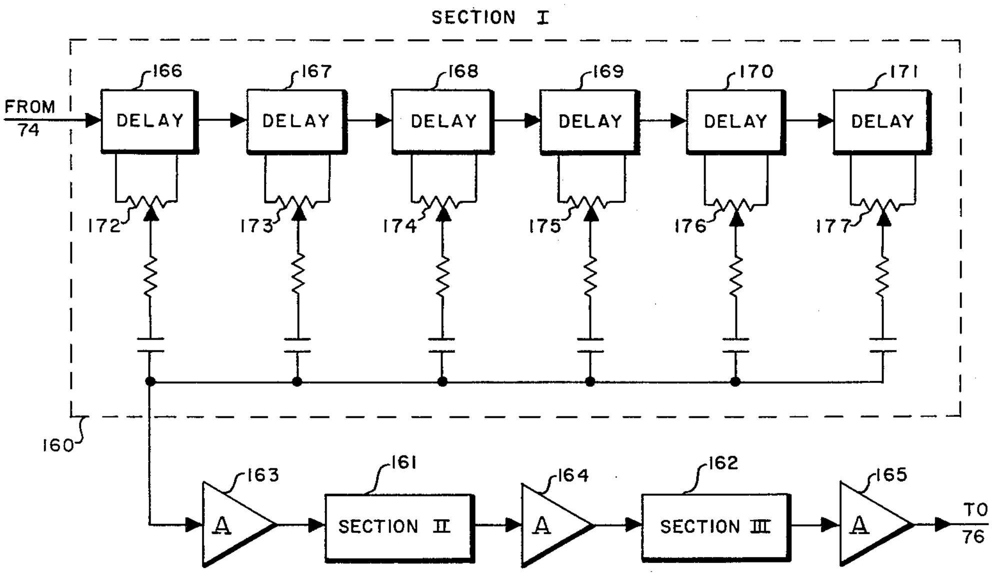
Figure 9:
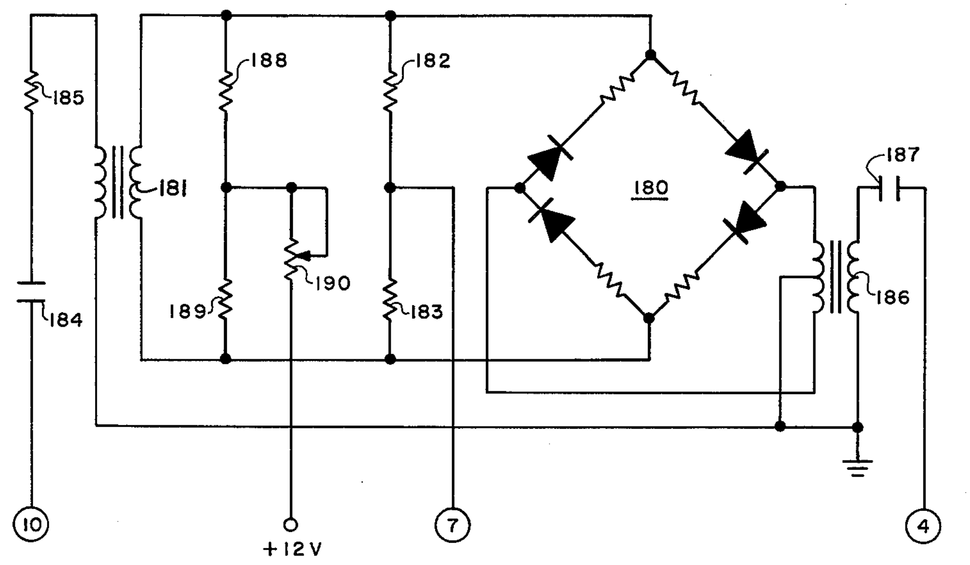
Figure 10:
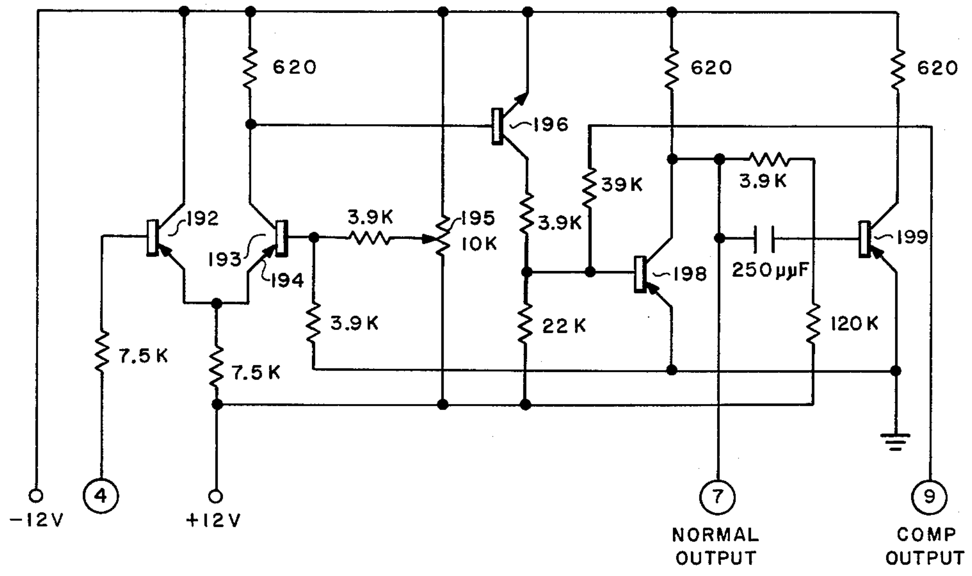

FIG. 2*a* is a diagram showing waveforms at various points in the transmitter;

FIG. 3 is a block diagram of the receiver;

FIG. 4 is a block diagram of the receiver code converters;

FIG. 5 is a block diagram of the clock signal control circuit;

FIG. 6 is a diagram showing waveforms in the receiver code converters;

FIG. 7 is a circuit diagram of a flip flop circuit;

FIG. 8 is a diagram of the distortion correction circuit;

FIG. 9 is a diagram of the modulator and demodulator circuit;

FIG. 10 is a diagram of a slicer circuit.

Figure 1:
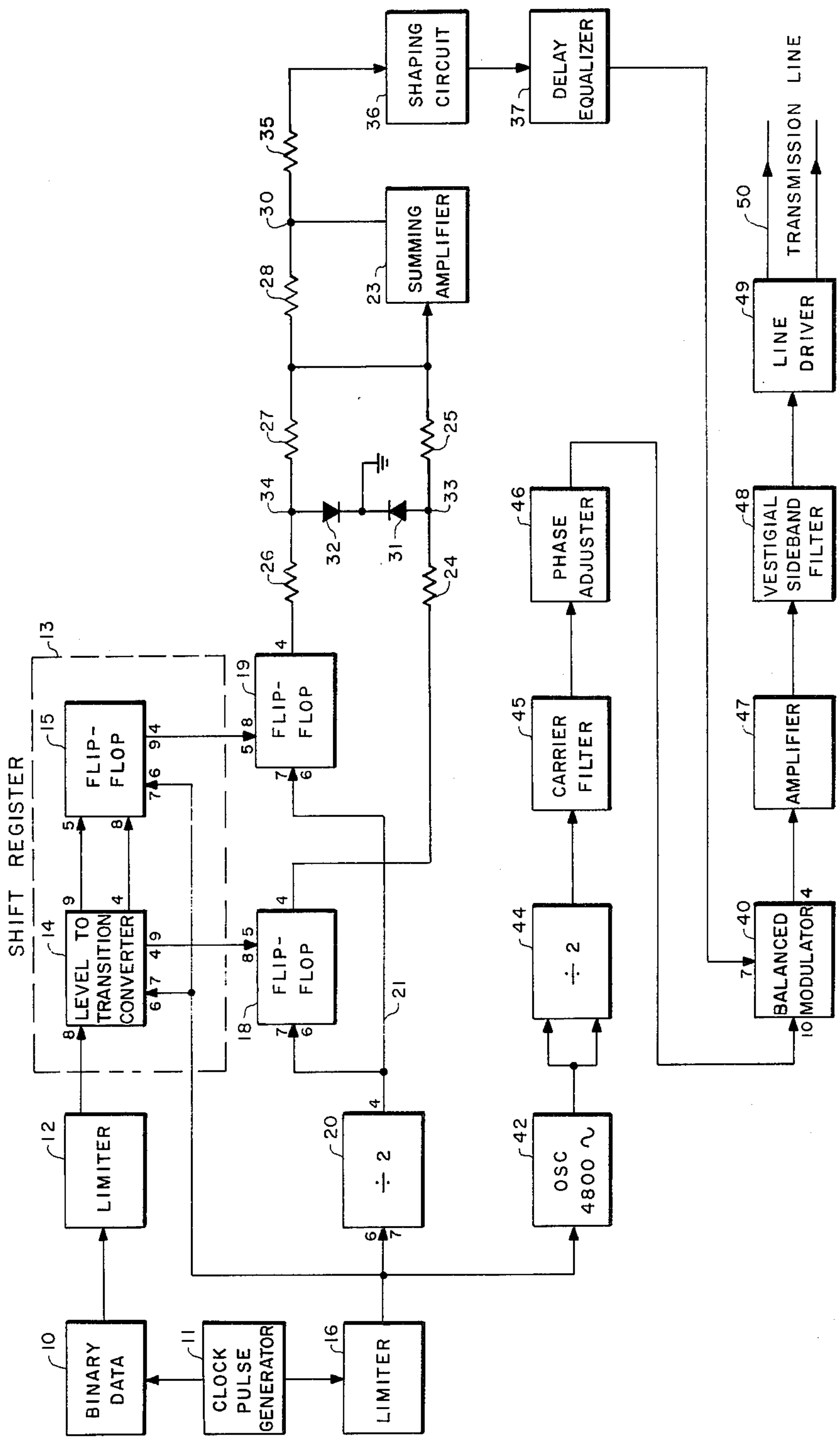
FIG. 1 is a block diagram of the transmitter.

The transmitter, as shown in FIG. 1, is provided with serial binary information from a synchronized data source 10 connected to a clock pulse generator 11. A given constant voltage represents a binary one and another constant voltage represents a binary zero of the data. The binary data is limited to a given voltage level by limiter 12. The data is then supplied to data converter 14, which changes the input data so that transitions from one voltage level to another represent a binary one, and the absence of transitions represents a binary zero. The level-to-transition converter 14 is shown in detail in FIG. 2. It comprises transistors 51, 52 and 53 having grounded emitters and coupled by resistors as shown in FIG. 2, with the collector of one connected to the base of the next transistor. Transistors 54 and 55 are connected by a resistor and capacitor network to form a flip-flip circuit, similar to that shown in FIG. 7 and described in connection with the latter figure. The binary data A is fed to terminal 8 and the output data B from terminal 9 is fed back over conductor 56 to the base of transistor 51. The circuit of transistor 51 then functions as an OR gate. Data A and B are also fed to diodes 57 and 58, which are connected to junctions 61 of resistors 59 and 60 to form an AND gate. Transistor 53 is connected as an inverter circuit so that output Y of transistor 53 is the complement of output X of transistor 52. Outputs X and Y are impressed on the base electrodes of transistors 54 and 55 through the gate comprising resistors 62, capacitors 63 and diodes 64. The X and Y data is gated one bit at a time into the flip-flop of transistors 54 and 55 on the positive going transitions of the clock pulses applied to terminals 6 and 7.

Let us assume that a binary one is represented by zero volts on terminal 8 and binary zero is represented by −12 volts, and that initially data A is zero volts and B is −12 volts. Transistors 51 and 53 conduct and transistor 52 is off, making X equal −12 volts and Y equal zero volts, nominally. At the first positive transition of the 4800 p.p.s. clock applied to terminals 6 and 7 the Y signal is gated through and turns transistor 55 off and 55 turns transistor 54 on. Now signals A and B are zero volts and 51 is off, 52 on, 53 off, 54 on, and 55 off, so that terminal 9 is at zero volts and terminal 4 is at −12 volts. Thus there has occurred a transition output of −12 volts to zero volts on terminal 9 and an opposite change on terminal 4 upon a positive clock transition when a "one" was on terminal 8. This is shown in FIG. 2*a*, wherein the top line 1 shows the 4800 p.p.s. clock, line 2 shows an assumed train of input data on terminal 8, and line 3 shows the transition data on pin or terminal 9. It can be seen that at the time of the first positive going transition of the clock there is a transition of data B on lines 3 and 6. The data shown in line 2 then goes to binary zero and for the next clock pulse, point 61, FIG. 2, is then at −12 v., X is −12 v. and Y is zero volts. Y is now of a value which can be gated through on the next positive clock transition to turn transistor 55 off, but since it is already off no transition occurs. Thus for zero in the data no transition takes place. The same conditions remain for the next data bit, which is a zero. The fourth data bit (line 2) is a binary one, and so a transition should occur. On the positive clock transition, Y is gated through and turns off transistor 55. Thus a transition occurs on the output for a binary one on the input. The remainder of the data shown on line 2 of FIG. 2*a* is processed as shown in lines 3–6 of FIG. 2*a*.

When, as previously stated, "0"=−12 v. and "1"=0 v., the relation of the X and Y signals to the A and B signals are given by the following table:

| A | B | X | Y |
|---|---|---|---|
| 1 | 1 | 1 | 0 |
| 1 | 0 | 0 | 1 |
| 0 | 1 | 0 | 1 |
| 0 | 0 | 1 | 0 |

Expressed in Boolean algebra $$Y=A\oplus B=\overline{A}\cdot B+A\cdot\overline{B}$$

$$X=\overline{A\oplus B}$$

The binary data in converter 14 shown in FIG. 1 is changed to quaternary code data having half as many bits, to wit 2400 bits instead of 4800 bits, with each bit having one of the values 0, 1, 2, or 3. The circuit for making this conversion includes gated flip-flops 15, 18 and 19, and summing amplifier 23. Flip-flops 15, 18 and 19 are of the form shown in FIG. 7 and will be described later. Flip-flop 15 and the flip-flop portion of circuit 14 constitute a shift register 13 which stores a data bit while flip-flop 18 is being loaded with the following bit. As shown on line 9 of FIG. 2*a*, the output of flip-flop 15 is delayed a time equal to one bit from the output of converter 14. The 4800 cycle clock is divided by circuit 20 to provide a 2400 cycle clock for gating flip-flops 18 and 19, to take the data from them two bits at a time. The output of flip-flops 18 and 19 are added together by the summing circuit including resistors 24–28, zener diodes 31 and 32 and amplifier 23 to provide the signals shown in line 11 of FIG. 2*a*. In one embodiment resistors 24 and 26 were 3000 ohms, 25 was 200,000 ohms, 27 was 100,000 ohms, 28 was 50,000 ohms and 31 and 32 were a matched pair of 6-volt zener diodes. Outputs from flip-flop 19 are given twice the value of outputs from flip-flop 18, as, for example, in the following table.

| Binary Code | 4-Level Code | FF 18 Output, v. | FF 19 Output, v. | Amp. 23 Output, v. |
|---|---|---|---|---|
| 01 | 1 | −12 | 0 | −3 |
| 11 | 3 | −12 | −12 | −9 |
| 10 | 2 | 0 | −12 | −6 |
| 00 | 0 | 0 | 0 | 0 |

The quaternary signals are fed through resistor 35 to shaping filter 36. Filter 36 shapes the four level signal to eliminate unnecessary frequency components. This permits the use of maximum useful transmitted power and eliminates extra circuitry for handling unneeded frequency components, which in any event are substantially eliminated by the transmission line. Since the phase shift of filter 36 is not entirely linear it is followed by a delay equalizer 37, thus eliminating a source of delay distortion.

Balanced modulator 40 receives the output signals of delay equalizer 37 on one of its inputs and a carrier signal synchronized with the data stream on another of its inputs. The carrier signal channel comprises a 4800 c.p.s. square wave oscillator 42. The output of oscillator 42 is supplied to flip-flop 44, which divides the frequency by 2 and produces a 2400 c.p.s. square wave which is shaped into a sine wave by carrier filter 45. The sine wave is then delivered to balanced modulator 40, the circuit of which is shown in FIG. 9, through phase adjuster 46 for bringing the carrier into phase with the data signals. The carrier oscillator is used to provide a carrier frequency which does not vary with changes in the clock signal rate, which is a function of the data signal rate. The suppressed carrier output of balanced modulator 40 is acted on by amplifier 47 and vestigial sideband filter 48. The vestigial sideband signals are then amplified by a line driver 49 which is matched to a transmission medium such as a standard 600 ohm telephone line 50.

In the suppressed carrier modulated output wave a binary "one" is represented by one phase of the carrier, while a binary "zero" is represented by the opposite phase of the carrier. Therefore, as no absolute phase reference exists at the receiver, an ambiguity exists between a zero and a one, making it possible for data to be reconstructed in the inverted or complementary sense. This ambiguity is resolved by converting the binary information to a type wherein the original binary one level is represented by a transition synchronized to the data clock, and the original binary zero level is represented by the absence of a transition. This type of coding is invariant under inversion, since the information is contained in the transitions between levels rather than in the levels themselves. The code converters in the transmitter first performs the above operation on the binary data, then, for a 4800 bit/second rate, converts the resulting data to four level data and the binary-to-quaternary transformation maintains the invariance of the code.

FIG. 3 shows the receiver. Transmission line 50 is impedance matched by any suitable circuit 71 such as a transformer coupled emitter follower to bandpass filter 72. Filter 72 has a nominal pass band of 300–3000 c.p.s. and attenuates line noise or transients outside this frequency range. The filter is designed to have a linear phase curve over nearly the entire pass band and an attenuation of 30 db or more outside the band $$\omega=2\pi f=1350 \text{ to } 28{,}000$$

Filter 72 is followed by an A.G.C. and amplifier circuit 74, whose function is to correct for signal variations due to transmission medium attenuation. An A.G.C. range of +5 db to −35 db is sufficient. The control voltage for the A.G.C. is developed from the recovered carrier, as will be described later. From the A.G.C. circuits 74 the signal is fed to intersymbol interference corrector 75, which is labeled and hereafter referred to as ISIC. This circuit is described in "An Intersymbol Adjustment Method of Distortion Compensation," by E. Gibson, Proceedings of the Military Electronics Conference, June 1961; and in "A Highly Versatile Corrector of Distortion and Impulse Noise," by E. Gibson, Proceedings of the National Electronics Conference, October 1961; and is disclosed in application S.N. 133,966 filed August 25, 1961, and is fully described therein. The function of ISIC circuit 75 is to correct for the amplitude and phase distortion introduced by the transmission medium.

The output of ISIC circuit 75 is fed through amplifier 76 to demodulator 77. In order to demodulate properly, the 2400 c.p.s. carrier must be recovered from the incoming data. Since the method of transmission is suppressed carrier phase reversal, a simple carrier selection filter cannot be used. The method used is to modulate the output from amplifier 76 with the output from the demodulator 77 and amplifier 78 in the modulator 79. The output from the modulator 79 is the carrier plus sideband components. Since the distortion and noise added by the line and other system components can not be compensated for perfectly, the modulator output signal is distorted. The carrier is then extracted by the carrier recovery or selection filter 80 tuned to 2400 c.p.s. A delay circuit 81 follows filter 80 to equalize or compensate for the delay introduced by the selection filter, so that the carrier is in the right phase relationship with data signal. The carrier has amplitude jitter caused by noise and distortion and so is squared by circuit 82 before being applied to demodulator 77. Demodulator 77 and modulator 79 are shown in FIG. 9 and described in connection therewith.

The output of carrier recovery filter 80 is also supplied over lead 85 as the reference or control signal for A.G.C. circuit 74. The reason for using the output of filter 80 as the A.G.C. signal is that this signal does not change in amplitude with the data signal transitions but does change in amplitude if the over-all signal level changes. Thus, if the transmission medium increases in attenuation, the recovered carrier signal decreases which in turn increases the gain of the A.G.C. amplifier.

The demodulated four level signals are supplied by amplifier 78 to low pass filter 86 to remove unwanted frequency components produced during the demodulation process. This is a low pass filter having an attenuation of 30 db or more above $\omega=19000$. The filter is followed by a delay circuit 87 which is designed to make the phase curve of filter 86 plus the delay stage 87 linear and thereby eliminate a source of phase distortion. The signal level is brought to the required level by amplifier 88 for utilization by a quaternary to binary code converter 90. Since the binary values correspond to transitions between levels at the output of code converter 90, it is followed by a transition converter 91 for obtaining the original binary data supplied to the transmitter. A corrected clock generator 83 supplies 2400 c.p.s. and 4800 c.p.s. clock pulses to converters 90 and 91. The generator is synchronized to the incoming signals fed thereto over conductor 84 as fully explained in connection with FIG. 5.

FIG. 4 shows code converters 90 and 91 in more detail. Assume that amplifier 88 impresses the data signal shown in line (*a*) of FIG. 6 on level slicer circuits 95–97. Quaternary to binary converter 90 (FIG. 3) converts a four level data signal to an equivalent two level signal. The quaternary signal may be analog or digital in nature; i.e., it may be shaped by low pass filters, or it may have fast rise times and discrete levels. In FIG. 6, line (*a*) shows a typical four level waveform with the corresponding digital signal superimposed. The truth table for converter 90 is:

| Quaternary | | Binary | |
|---|---|---|---|
| Digital | Analog Signal (X) | 1st bit | 2nd bit |
| 0 | $X<-V$ | 0 | 0 |
| 1 | $-V<X<0$ | 0 | 1 |
| 2 | $0<X<V$ | 1 | 0 |
| 3 | $X>V$ | 1 | 1 |

In the following discussion, a binary ONE is represented by zero volts, a binary ZERO by −10 volts. The slicers are biased to trigger at voltage levels −V, 0, +V, for example −3 v., 0, and +3 v., respectively. The "normal" outputs B and C of slicers 96 and 97 at terminals 7 as shown in FIG. 4 are zero volts when the input is more positive than the slicing level, and are −10 volts when the input is more negative than the slicing level. These are indicated in FIG. 6 at lines (*c*) and (*d*) showing the voltage outputs of the circuit in response to the illustrated input signal represented by the uppermost curve. At terminals 9 of slicers 95 and 96 a "complementary" output $\overline{A}$ of −10 volts is obtained when the input signal is more positive than the triggering level and zero volts when more negative than the triggering level, as indicated in line (*b*) of FIG. 6. Outputs $\overline{A}$ and B of slicers 95 and 96 are fed to OR gate 98 and outputs $\overline{B}$ and C of slicers 96 and 97 are fed to OR gate 99. These gates have outputs $\overline{A \text{ and } B}$, and $\overline{B \text{ and } C}$ respectively. The outputs of the three slicer circuits are sampled by the positive transition of the 2400 cycle clock pulses shown in line (*h*) of FIG. 6. The $\overline{B}$ output of slicer 96 is supplied directly to terminal 5 of flip-flop circuit 100 to give the first bit of a two-bit sequence.

Flip-flop 106 is set to the second binary bit in response to OR gates, 98 and 99, pulse gates 102 and 104, and the internal pulse gates of flip-flop 106, the circuit of which is shown in FIG. 7. Flip-flop 106 is set and reset at the positive transistors of the normal 2400 c.p.s. clock supplied over conductor 92 according to the following logic:

$$\text{SET}=(\overline{A+B}+C)\cdot(\text{normal 2400 clock pulse})$$
$$\text{RESET}=(\overline{B+C}+A)\cdot(\text{normal 2400 clock pulse})$$

The $\overline{A+B}$ and $\overline{B+C}$ outputs of OR gates 98 and 99 are shown in lines (*e*) and (*f*) of FIG. 6. The normal output D of flip-flop 106 is shown in line (*i*). Setting of flip-flop 106 is enabled by signals of values 1 and 3 and resetting is enabled by signals of values 0 and 2.

Flip-flop 100 is set or reset by the outputs of gates 107 and 108 at the positive transitions of the complementary 2400 c.p.s. clock supplied by conductor 93 according to whether the output of flip-flop 106 is ONE or ZERO, respectively. Flip-flop 100 is also set or reset through the action of its internal gates at the positive transition of the normal 2400 c.p.s. clock, on conductor 109, according to whether output B (line *c*) is ONE or ZERO, respectively. The set and reset logic for flip-flop 100 is then:

$$\text{SET}=D\cdot(\text{COMP. 2400 Clock Pulse})+B\cdot(\text{NORM. 2400 Clock Pulse})$$
$$\text{RESET}=\overline{D}\cdot(\text{COMP. 2400 Clock Pulse})+\overline{B}\cdot(\text{NORM. 2400 Clock Pulse})$$

The output E of flip-flop 100 shown in line (*j*) of FIG. 6 is the reconstructed binary data at the 4800 clock rate shown in line (*g*).

Since the binary data was converted at the transmitter so that ONES were represented by transitions rather than a voltage level, converter 91 (FIG. 3) is used to reconvert transitions to levels. The transition-to-level converter 91 comprises flip-flop 110, which receives pulses from both sides of flip-flop 100. These pulses apply biasing voltage to the control electrodes of the two stages of flip-flop 110, and 4800 c.p.s. clock pulses are applied to these control electrodes via conductor 94. Both the input and output pulses of flip-flop 110 are supplied to AND gates 111 and 112. The outputs of gates 111 and 112 are impressed on OR gate 113. Level slicer circuit 115 has a connection 116 from the output of A.G.C. circuit 74 and impresses an inhibit signal via conductor 117 on gate 113 in response to a "no signal" condition at the output of A.G.C. circuit 74, for the purpose of preventing errors in case of transmission line drop-out. The latter actuates inverter 114 to produce the original binary information delivered to the transmitter.

The operation of the transition to level converter is as follows: Flip-flops 100 and 110 form a two bit shift register. The output of F of flip-flop 110 is the same as that of flip-flop 100 except for a one bit delay, as shown in line ($k$) of FIG. 6. Gates 111–113 form an exclusive OR circuit which compares the contents of flip-flops 100 and 110. Gate 111 provides the output $\overline{E}\cdot F$ and gate 112 provides the output $E\cdot F$, shown in lines ($l$) and ($m$) of FIG. 6. The output G of OR gate 113 is $E\cdot F+E\cdot F$ and this is inverted by circuit 114 to produce the output G shown in line ($n$) of FIG. 6. The transitions and quaternary conversions performed in the transmitter and receiver are compatible so that the output G is always the same as the input to the transmitter, except for transmission time relay, despite phase inversions during transmission.

The clock signals of the receiver are derived from a local standard clock circuit which has very high stability. In order to sample the data signal properly, the clock signal must be phase corrected to synchronism with the data signal. This is accomplished in the following manner. The data signal zero crossings are obtained from the output of slicer circuit 96 and fed over conductors 120 and 121 to gates 122–125 shown in FIG. 5. These zero crossings are compared by the gates with the transitions of the clock pulses which are fed over conductor 126 and inverter 128 from the output of flip-flop circuit 130. The outputs of the gates are developed across center tapped resistors 131, 132 and impressed on binary counters 133 and 134, which count the number of times the data transitions lead or lag the clock transitions. Pulses occurring during the binary one condition of the "normal" clock supplied via conductor 126 are gated to binary counter 133, while pulses occurring during the binary zero condition are gated to binary counter 134. Clock pulses which are "early" are gated to counter 133 and "late" pulses are gated to counter 134. An early pulse is used to indicate the clock phase that requires advancing, wihle a late pulse indicates the clock phase that requires retarding in order that sampling occurs in the center of each bit. Since these pulses contain jitter due to time jitter in the incoming data, they cannot be used directly to control the clock phase but must be integrated over a specified period of time. The integration is performed digitally by the remaining part of the phase correction circuit.

Counters 133 and 134 produce output pulses after counting 16 pulses. If the clock pulses are in proper phase, the counter output alternate and result in no phase correcting signals. The outputs of the counters are impressed on flip-flops 136 and 137 and on gates 138, 139 and 140, 141. "AND" gates 142 and 143 are connected to the outputs of flip-flops 136 and 137, and conductor 117 feeds inhibit pulses to gates 142 and 143 to prevent an output therefrom during a "No signal" condition. The arrangement is such that when flip-flop 136 is in a "one" condition and flip-flop 137 is in a "zero" condition, the output of counter 133 will cause an "advance" pulse to be produced by one shot circuit 145. Similarly, if flip-flops 136 and 137 are both in a "one" condition, counter 133 will cause one shot circuit 146 to produce a "retard" pulse. The advance or retard pulse is impressed on local clock generator 150 for correction of the clock output, and finally on a level slicer or limiter 151.

The system shown in FIG. 1 utilizes a quaternary code for transmission at data speeds up to 4800 bits per second. The binary to quaternary code converter is not required, however, where data speeds of only 2400 bits per second are removed or disabled, terminal 4 of circuit 14 is connected directly toresistors 24 and 26. The system then operates with phase shift modulation only, a binary "one" being represented by 180° phase shift and binary "zero" represented by the absence of a phase shift. At the receiver the quaternary to binary code converter is then unnecessary and is short circuited or removed.

The entire system, as actually constructed, lends itself to transistorization and a particular advantage of the system is that it has been designed with a minimum number of different circuits. Thus, circuits 14, 15, 18, 19, 20, 44, 100, 106, 110, 130, 136 and 137, although they serve various purposes, are all circuits according to FIG. 7. It will be noted that the circuit of FIG. 7 is a transistor flip-flop having resistor-capacitor-diode gates 152–154 and 155–157. In a particular embodiment, the transistors 158, 159 are type 2N414. Such gated flip-flops are known in the prior art. A two stage shift register formed of such gated flip-flops, corresponding to shift register 13 (FIG. 1) except that it is designed for higher speeds of operation, is disclosed in A Handbook of Selected Semiconductor Circuits, NavShips 93484, pages 7–46.

As previously stated, correction circuit 75 of FIG. 3 is disclosed in application Serial No. 133,966 filed by Earl D. Gibson. The purpose of the circuit is to correct for phase and amplitude distortion of the signals and reduce the effects of impulse noise, which occur during transmission. The circuit as illustrated in FIG. 8 has three sections 160–162 connected to summing amplifiers 163–165. Each section consists of a series of delay circuits 166–171. The outputs of the delay circuits are obtained across potentiometers 172–177, the adjustments of which vary the amplitudes of the output signals and provide signals of one phase or the other depending on which side of the center of the potentiometer the tap is set. The delay circuits can be of any suitable form, such as a push-pull amplifier feeding an impedance bridge having the required delay, as disclosed in FIG. 5 of the application of Earl D. Gibson mentioned above. The potentiometers 172–177 are adjusted to give maximum reduction of distortion. The number of delay circuits, and the number of section and the delay of each circuit are variable. For accurate correction of delay distortion of the transmission system approximately $2n$ delay stages are needed for $n$ radians of peak deviation of the phase curve of the transmission system from linearity. For approximate correction, two delay stages are required for each 180° of phase curve deviation from linearity. The delay per stage was made 1/7200 or $1/2f$, where it was desired to equalize the transmission line up to a frequency $f$ equal to 3600 c.p.s.

FIG. 9 shows a circuit which serves as the balanced modulator 40, FIG. 1, and demodulator 77 and modulator 79 of FIG. 3. A rectifier resistance bridge 180 has transformer 181 connected across one diagonal, which is spanned by like resistors 182 and 183 having center tap terminal No. 7. Transformer 181 is connected to input terminal No. 10 through capacitor 184 and resistor 185. Transformer 186 has one winding connected across the other diagonal of bridge 180 and its other winding connected between ground and terminal No. 4 through capacitor 187. When the circuit is used as a demodulator 4 serves as the signal input terminal and the output appears on terminal 7. When the circuit is used as a balanced modulator the signal is impressed on terminal 7 and the carrier on terminal 10 while the output appears on terminal 4, and a bias is applied to the junction of resistors 188 and 189. The bias is adjusted by variable resistor 190 to balance the circuit to produce an output of one phase for inputs signals which are above a given voltage level and of the opposite phase for input signals which are below the given voltage level. The operation of the circuit as a balanced modulator or a demodulator will be apparent to those skilled in the art.

The level slicer circuits 95, 96, 97, etc., may be any known circuit for giving one output voltage whenever the input signal is below a given value and another output voltage whenever the input signal is above that value. An example of such a circuit is shown in FIG. 10. The input signal is placed on pin 4 connected to the base electrode of transistor 192 of an emitter follower. A signal of increasing voltage produces an increasing voltage on the emitter of transistor 192 and this voltage is impressed on emitter 194 of transistor 193. The base of the latter is normally biased to cutoff by potentiometer 195, but when the voltage of emitter 194 rises to a given value transistor 193 conducts. The negative voltage on the base of transistor 196 therefore decreases and causes transistor 196 to conduct, placing a negative bias on the base of transistor 198 and to render it conductive. The voltage on pin 7, therefore, rises from about −10 volts to near zero volts. Transistor 199 is connected to the output transistor 198 to form an inverter. The output on pin 9 is then the complementary output of the normal output on pin 7. In a particular embodiment the circuit components and voltages used were as shown in FIG. 10. Transistors 192, 193, 198, and 199 were Type 2N404 and transistor 196 was Type 2N1302.

Although an exemplary embodiment of the invention has been shown and described it is evident that many variations and modifications thereof can be made by those skilled in the art without departing from the principles of the invention as defined in the claims.

What is claimed is:

1. A digital data transmission system comprising:
(a) a transmitter and a receiver adapted to be coupled to a communication medium; said transmitter including;
(b) means for receiving binary digital data,
(c) means for generating a carrier wave and synchronizing the carrier wave and the digital data with each other,
(d) converting means connected to said data receiving means for producing a wave in which one binary value of the data is represented by a transition from one voltage level to another and the other binary value is represented by no transition,
(e) modulating means connected to said converting means and carrier generating means for generating a suppressed-carrier vestigial-sideband modulated wave and
(f) means for impressing said modulated wave on the communication medium;
(g) said receiver including
(h) means for coupling to the communication medium for receiving and amplifying the modulated wave,
(i) demodulating means including a demodulator connected to said amplifying means and
(j) carrier recovery means connected to the demodulator for deriving from the received modulated wave an unmodulated carrier frequency wave and impressing it on the demodulator,
(k) and digital data output means connected to the output of the demodulator.

2. A system according to claim 1, wherein said receiver includes means for automatically controlling the gain of the amplifying means in response to the derived unmodulated carrier frequency wave.

3. A system according to claim 1, wherein said receiver includes means for obtaining a plurality of samples of the received wave having predetermined amplitudes and delays relative to one another and for summing said samples for correcting the amplitude and phase distortion introduced by the transmission medium.

4. A system according to claim 3, wherein said means for correcting distortion includes a plurality of cascade connected sections, each section having a plurality of series connected delay means having outputs connected in parallel to a summing amplifier.

5. A system according to claim 1, wherein said transmitter includes means for converting binary data to quaternary data, and means connected to the output of said demodulator for converting quaternary data to binary data.

6. A system according to claim 1, including for converting the output of the demodulator to a wave in which a binary "one" is represented by one voltage level and a binary zero is represented by a second voltage level.

7. A system according to claim 5, including means at the receiver for producing clock pulses, means for adjusting the phasing of said clock pulses into synchronism with the received data and means for supplying said clock pulses to said quaternary to binary converting means.

8. A digital data transmission system comprising:
(a) a transmitter including
(b) means for receiving binary digital data and converting said binary data to quaternary digital signals having four predetermined voltage values,
(c) means for generating a carrier wave in synchronism with the digital data,
(d) modulating means connected to said data receiving and converting means and carrier generating means for modulating the carrier wave so that each cycle has either of two opposite phases and either of two predetermined finite amplitudes in accordance with the value of each quaternary data bit, and
(e) means for impressing said modulated wave on a communication medium; and
(f) a receiver including
(g) means for coupling to the communication medium for receiving and amplifying the modulated wave,
(h) demodulating means including a demodulator connected to said amplifying means and
(i) digital data output means connected to the output of the demodulator.

9. A digital data transmission system comprising:
(a) a transmitter including
(b) means for receiving binary digital data,
(c) means for converting said binary data to quaternary data having half as many bits per second as the binary data,
(d) means for generating a carrier wave in synchronism with the digital data and having a frequency equal to the number of quaternary data bits per second,
(e) modulating means connected to said data receiving means and carrier generating means for generating a suppressed-carrier vestigial-sideband modulated wave of which each cycle has either of two opposite phases and either of two predetermined finite amplitudes in accordance with the value of each quaternary data bit, and
(f) means for impressing said modulated wave on a communication medium; and
(g) a receiver including
(h) means for coupling to the communication medium for receiving and amplifying the modulated wave,
(i) demodulating means including a demodulator connected to said amplifying means and
(j) carrier recovery means connected to the demodulator for deriving an unmodulated carrier frequency wave and impressing it on the demodulator,
(k) means connected to the demodulator for converting quaternary signals to binary data signals, and
(l) digital data output means connected to the output of the demodulator.

10. A digital data transmission system comprising:
(a) a transmitter and a receiver adapted to be coupled to a communication medium;
(b) said transmitter including
(c) means for converting binary digital data signals of one voltage level to voltage transitions and signals of another voltage level to no transitions,
(d) means for generating a carrier wave in synchronism with the digital data and having a constant frequency equal to the maximum number of data bits per second,
(e) modulating means connected to said data converting means and carrier generating means for generating a suppressed-carrier wave modulated by phase reversals, and
(f) means for impressing said modulated wave on a communication medium;
(g) said receiver including
(h) means or receiving and amplifying the modulated wave,
(i) demodulating means including a demodulator connected to said amplifying means,
(j) carrier recovery means connected to the demodulator for deriving therefrom an unmodulated carrier frequency wave and impressing it on the demodulator,
(k) and digital data output means connected to the output of the demodulator, including means for converting each data bit voltage transition to one binary voltage level and the absence of a voltage transition to another voltage level.

11. A digital data transmission system comprising:
(a) a transmitter and a receiver adapted to be coupled to a communication medium;
(b) said transmitter including
(c) means for receiving digital binary data each bit of which has either of two voltage values,
(d) means for generating a carrier wave and synchronizing the digital data with the carrier wave,
(e) modulating means connected to said data receiving means and carrier generating means for producing a carrier wave modulated with a phase reversal in response to each bit having a given one of said two voltage values, and
(f) means for impressing said modulated wave on the communication medium;
(g) said receiver including
(h) means for coupling to the communication medium for receiving and amplifying the modulated wave, and,
(i) demodulating means including a phase demodulator connected to said amplifying means.

12. A system according to claim 11 comprising:
(a) a voltage converting means connected between the data receiving means and the modulator for converting only one of said two voltage values of each bit to a transition from one voltage level to another,
(b) said voltage converting means comprising an "exclusive OR" circuit,
(c) an inverter connected to the "exclusive OR" circuit for producing a voltage wave which is an inverse of the output of the "exclusive OR" circuit,
(d) a flip-flop circuit,
(e) gating means connecting the "exclusive OR" circuit and the inverter to the flip-flop circuit for triggering the latter, and,
(f) means for impressing the outputs of said data receiving means and said flip-flop circuit on the input of the "exclusive OR" circuit.

13. A digital data transmitter having means for transforming digital binary signals of which each bit has either of two voltage values so that one of said voltage values is changed to a transition from one voltage level to another, comprising:
(a) an "exclusive OR" circuit
(b) a voltage inverter circuit connected to the output of the "exclusive OR" circuit,
(c) a flip-flop circuit,
(d) gating means connecting the "exclusive OR" circuit and the inverter circuit to the flip-flop circuit for triggering the latter, and
(e) means for impressing said digital binary signals and the output of the flip-flop circuit on the input of the "exclusive OR" circuit.

14. A digital data transmission system having means for converting incoming binary signals having two voltage levels into binary signals in which one binary value is represented by a voltage jump and the other binary value is represented by the absence of a voltage jump, comprising:
(a) a flip-flop circuit having first and second electron discharge devices,
(b) first and second means for triggering said first and second electron discharge devices respectively, and
(c) pulse comparing means connected to said first and second triggering means for comparing the incoming binary signals and the output of the flip-flop circuit and triggering the flip-flop circuit in response to an incoming signal of one of said two voltage levels.

15. Voltage converting means according to claim 14, wherein said pulse comparing means includes an "exclusive OR" circuit and an inverter circuit connected to the output of the "exclusive OR" circuit.

16. In a digital communication system,
(a) a transmitter comprising
(b) a two-stage shift register,
(c) means for impressing binary signals on the shift register,
(d) a storage circuit connected to the output of each stage of the shift register,
(e) means for shifting the data in the shift register at a given frequency,
(f) a summing circuit connected to receive the outputs of both storage circuits,
(g) said summing circuit including means for producing an output voltage in response to one of the storage circuit outputs which is twice as large as the output voltage produced in response to the output of the other storage circuit,
(h) and means for feeding data from both storage circuits to the summing circuit at a frequency equal to half said given frequency.

17. In a digital data communication system,
(a) a receiver for code signals having values 0, 1, 2, and 3 represented by four voltage levels comprising
(b) first, second and third level detecting circuits each of which is triggered by a voltage between two adjacent levels of said four voltage levels,
(c) said level detecting circuits having normal and complementary outputs $\overline{A}$, B and $\overline{B}$ and C, respectively, where B and C are normal outputs and $\overline{A}$ and $\overline{B}$ are complementary outputs,
(d) a first flip flop circuit having a normal and a complementary output,
(e) means for setting and resetting the first flip flop circuit in response to the B and $\overline{B}$ outputs at the clock rate of the quaternary signals,
(f) a second flip flop circuit,
(g) means for triggering the second flip flop circuit at said clock rate but at instants displaced one half clock period from the triggering of the first flip flop circuit, (h) means for connecting the second flip flop circuit to the level detecting circuits for enabling setting thereof in response to quarternary signals having values of one and three and enabling resetting thereof in response to quaternary signals having values of zero or two, (i) and means for setting and resetting the first flip flop circuit in response to the normal and complementary outputs, respectively, of the second flip flop circuit, (j) whereby the first flip flop circuit produces binary signals at a rate equal to twice the rate of the quaternary signals.

References Cited by the Examiner

UNITED STATES PATENTS

| | | | |
|---|---|---|---|
| 2,195,855 | 4/40 | Fitch | 178—67 |
| 2,227,902 | 1/41 | Hahnle | 325—328 |
| 2,783,372 | 2/57 | Peterson et al. | 325—330 XR |
| 2,839,728 | 6/58 | Jacoby et al. | 340—347 XR |
| 2,907,525 | 10/59 | Hobbs et al. | 340—347 XR |
| 2,912,684 | 11/59 | Steele | 340—347 |
| 2,922,965 | 1/60 | Harrison. | |
| 2,926,346 | 2/60 | Smith et al. | 340—347 |
| 2,979,566 | 4/61 | Hopner et al. | 178—67 |

DAVID G. REDINBAUGH, *Primary Examiner.*